United States Patent [19]

Moeller

[11] Patent Number: 5,355,463
[45] Date of Patent: Oct. 11, 1994

[54] CIRCUIT CONFIGURATION FOR TRANSFORMING THE LOGICAL ADDRESS SPACE OF A PROCESSOR UNIT TO THE PHYSICAL ADDRESS SPACE OF A MEMORY

[75] Inventor: Udo Moeller, Duisburg, Fed. Rep. of Germany

[73] Assignee: Siemens Aktiengesellschaft, Munich, Fed. Rep. of Germany

[21] Appl. No.: 818,539

[22] Filed: Jan. 9, 1992

[30] Foreign Application Priority Data

Jan. 10, 1991 [EP] European Pat. Off. ........ 91100274.9

[51] Int. Cl.$^5$ .......................... G06F 12/10; G06F 9/32
[52] U.S. Cl. .................... 395/400; 395/375; 395/725; 364/244.3; 364/247; 364/254.5; 364/255.1; 364/256.3; 364/DIG. 1
[58] Field of Search ............... 395/400, 425, 375, 725

[56] References Cited

U.S. PATENT DOCUMENTS

| | | | |
|---|---|---|---|
| 4,032,896 | 6/1977 | Bennett et al. | 395/400 |
| 4,307,448 | 12/1981 | Sattler | 395/400 |
| 4,361,868 | 11/1982 | Kaplinsky | 395/400 |
| 4,761,733 | 8/1988 | McCrocklin et al. | 395/400 |
| 4,959,778 | 9/1990 | Miyadera et al. | 395/400 |
| 4,969,086 | 11/1990 | Pfeiffer et al. | 395/400 |
| 5,023,777 | 6/1991 | Sawamoto | 395/400 |
| 5,032,981 | 7/1991 | Bru et al. | 395/425 |
| 5,101,339 | 3/1992 | Fairman et al. | 395/400 |

OTHER PUBLICATIONS

Electronique Industrielle, No. 16, May 15, 1981, Paris, France, pp. 75-80, A. Diou.
EDN Electronical Design News, Book 26, No. 22, Nov. 11, 1981, Boston, Ma.; pp. 229-236, Tomaszewski.
Neues aus der Technik, No. 6, Dec. 15, 1979, p. 3.
IBM Technical Disclosure Bulletin, vol. 23, No. 3, Aug. 1980, p. 1109, McKinney et al.

*Primary Examiner*—Glenn Gossage
*Assistant Examiner*—Michael A. Whitfield
*Attorney, Agent, or Firm*—Herbert L. Lerner; Laurence A. Greenberg

[57] ABSTRACT

A circuit configuration for adapting a logical address space of a processor unit to a physical address space of a memory includes, an interpretation unit, and data and control lines connecting the interpretation unit to the processor unit. The interpretation unit includes a register having a first register region and having a second register region to be written into by the processor unit. The interpretation unit continuously evaluates a logic state of the processor unit, writes contents of the second register region into the first register region at defined logic states and outputs contents of the first register region as an address. A linking unit is connected by address lines to the processor unit, to the interpretation unit and to the memory. The linking unit forms a total address for the memory from addresses transferred by the interpretation unit and the processor unit.

7 Claims, 1 Drawing Sheet

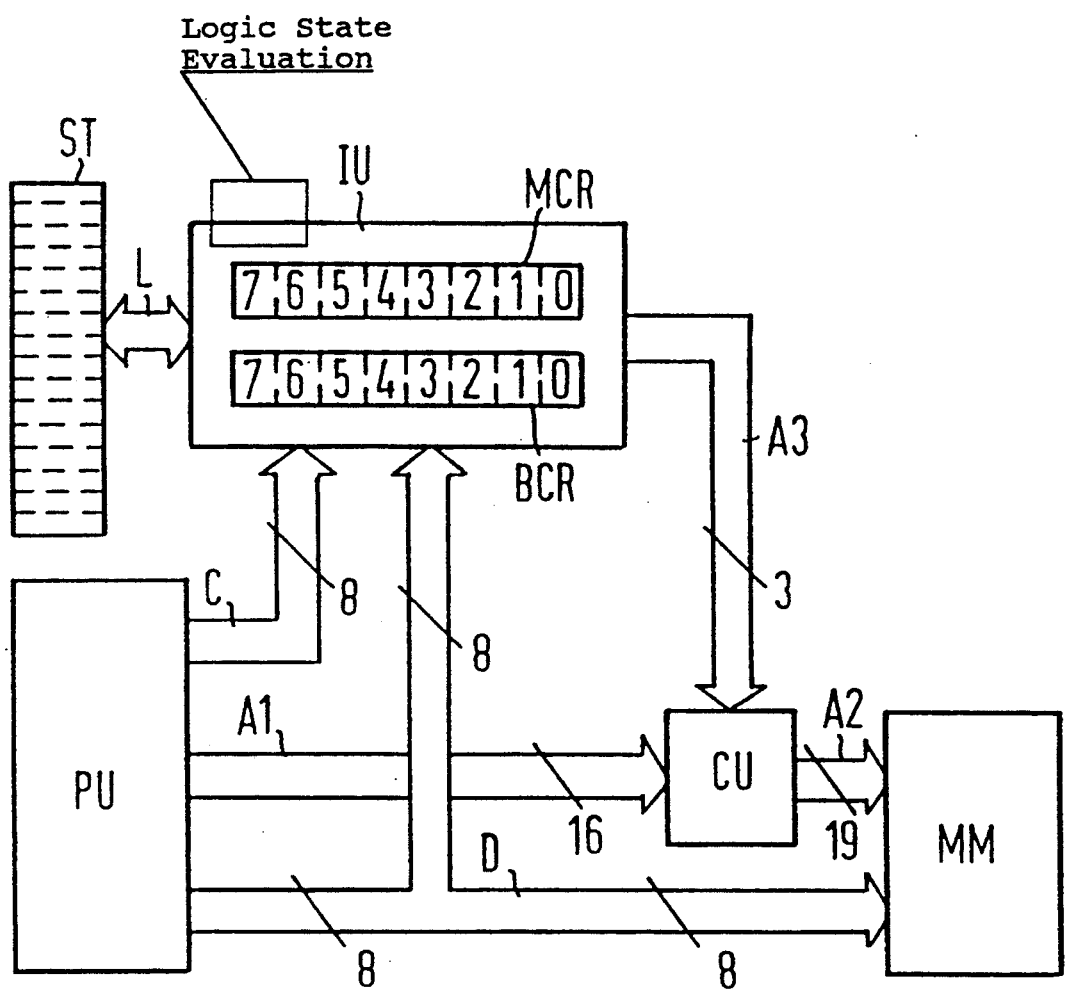

CIRCUIT CONFIGURATION FOR TRANSFORMING THE LOGICAL ADDRESS SPACE OF A PROCESSOR UNIT TO THE PHYSICAL ADDRESS SPACE OF A MEMORY

The invention relates to a circuit configuration for projecting or adapting the logical address space of a processor unit to the physical address space of a memory.

New kinds of applications continually arise for processing units, such as microprocessors, microcomputers or microcontrollers. However, the new applications also increase the demands made of the processor units and their architecture. In many kinds of architecture, the logical address space, or in other words the number of addresses that can be represented by the processor unit, is accompanied by a physical address space, that is the number of all of the possible addresses for the memory capacity that are available, which is many times greater.

It is accordingly an object of the invention to provide a circuit configuration for adapting the logical address space of a processor unit to the physical address space of a memory, which overcomes the hereinafore-mentioned disadvantages of the heretofore-known devices of this general type.

With the foregoing and other objects in view there is provided, in accordance with the invention, a circuit configuration for adapting a logical address space of a processor unit to a physical address space of a memory, comprising a memory, a processor unit, an interpretation unit, data and control lines connecting the interpretation unit to the processor unit, the interpretation unit including a register being divided into a first register region and a second register region, the second register region being intended to be written into by the processor unit, the interpretation unit having means for continuously evaluating a logic state of the processor unit, for writing contents of the second register region into the first register region at defined logic states and for outputting contents of the first register region as an address, a linking unit, and address lines connecting the linking unit to the processor unit, to the interpretation unit and to the memory, the linking unit forming a total address for the memory from addresses transferred by the interpretation unit and the processor unit.

In accordance with another feature of the invention, the processor unit has means for reading the register of the interpretation unit.

In accordance with a further feature of the invention, there is provided a stack register connected to the interpretation unit, contents of the first and second register regions being written into the stack register at defined logic states of the processor unit, and the stack register being read out from the first and second register regions at other defined logic states.

In accordance with an added feature of the invention, the register of the interpretation unit is a first register, and the interpretation unit includes a second register with two further register regions, the two further register regions being written into by the processor unit in each case upon an appearance of defined logic states.

In accordance with an additional feature of the invention, the second register has a given bit to be set by the processor unit, and the interpretation unit has means for selectively reading out the first register region and one of the further register regions at defined logic states of the processor unit, in dependence on the state of the given bit.

In accordance with yet another feature of the invention, the second register has a further bit for announcing an overflow of the stack register.

In accordance with a concomitant feature of the invention, the interpretation unit places the first and second register regions in a fixed state, upon resetting of the processor unit.

Other features which are considered as characteristic for the invention are set forth in the appended claims.

Although the invention is illustrated and described herein as embodied in a circuit configuration for adapting the logical address space of a processor unit to the physical address space of a memory, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

The drawing is a block circuit diagram of an exemplary embodiment of the invention.

Referring now to the single figure of the drawing in detail, it is seen that in this exemplary embodiment a given processor unit PU and a given memory M4 are assumed. The processor unit PU is connected to eight data lines D, sixteen first address lines A1, and eight control lines C. The data lines D are also connected to the memory MM and to an interpretation unit IU. The memory MM is also connected to nineteen second address lines A2. The interpretation unit IU, which contains a first region control register BCR and a second mode control register MCR, is also connected to the control lines C and to three third address lines A3. A stack register ST is also coupled to the interpretation unit IU, through connecting lines L. Finally, a linking unit CU is provided, which is connected to the first, second and third address lines A1, A2, A3.

The region control register BCR has a width of eight bits. Three of the four high-order bits, that is the most significant bits 4, 5 and 6, are assigned to a first register region. The three low-order bits, that is the least significant bits 0, 1 and 2, are assigned to a second register region. The processor unit PU can access both register regions, in such a way that both regions can be read out, but only the second region can be written upon by the PU. The writing and reading of the region control register BCR by the processor unit PU takes place through the data lines D. Moreover, through the use of the interpretation unit IU, first the contents of the first register region can be read out to the linking unit CU, and second the contents of the second register region can be transferred to the first register region. Consequently, in order to transfer the contents of the first register region to the linking unit CU, only three third address lines A3 are needed. The remaining bits of the region control register BCR, that is the bits 3 and 7, can optionally be used for other purposes, or can be acted upon by a fixed logic level. The 16 bits of the address furnished by the processing unit PU and the three bits of the address obtained from the interpretation unit IU, are used by the linking unit CU to form a nineteen-bit-wide total address, which is supplied to the memory M4 through the second address lines A2. The two addresses are linked together, for instance in such a way that the three bits of the interpretation unit IU produce the three high-order bits, and the sixteen bits of the processor unit PU produce the sixteen low-order bits of the total address. This makes the physical address space defined by the memory MM larger by three bits, or eight times as large as the logical address space defined by the processor unit PU. This can also be interpreted as having the memory MM divided into eight memory regions, which can each be addressed separately by the processor unit PU. In contrast, the applicable memory region is selected by the three bits supplied to the linking unit CU by the interpretation unit IU. The data written into the region control register BCR thus represent region identification numbers. The region identification number present in the first register region identifies the current memory region, and the contents of the second register region identify the next memory region to be processed.

The mode of operation is based on the fact that the interpretation unit IU ascertains the logical state of the processor unit PU from the signals transmitted over the control lines C, and optionally from the signals received on the data lines D as well, and reacts accordingly to certain logical states. If certain states arise, the contents of the second register region are transferred to the first register region, and a different memory region is thus selected. This means that the writing-in of the region control register BCR by the processor unit PU never takes place at the same time as a change in the memory region. The result is a delay between the writing-in and release of the applicable memory region.

Resetting of the processing unit PU is recognized by the interpretation unit IU, which thereupon sets the overall region control register BCR to zero. This means that the first and second register region and thus the current region identification number and the next region identification number are all equal to zero. The processor unit PU then begins to run through its program in a memory region having the region identification number of zero. During the running of the program, the region identification number of the next selected memory region is then written into the second register region at some arbitrary point. As the process continues, a memory region change can then be carried out by means of certain control signals, by transferring the contents of the second register region into the first register region.

According to a feature of the invention, one bit, for example the most significant bit 7, is provided in the mode control register MCR of the interpretation unit IU to identify a data memory mode. In this operating instance, the bit 7 is equal to a logical one. A further bit of the mode control register MCR, for example the bit 3, signals whether or not the stack memory ST is filled by means of a logical zero. Moreover, the bits 4, 5 and 6 form a third register region, and the bits 0, 1 and 2 form a fourth register region.

The bit 7 of the mode control register MCR is referred to below as the memory mode bit. When the memory mode bit 7 of the mode control register MCR is set, then upon data access by the processor unit PU, the contents of the third register region, instead of the contents of the first register region, appear on the third address line A3. If the memory mode bit is equal to a logical one, for example, then the address on the third address lines does not vary in the case of data access. Moreover, the interpretation unit IU may optionally transfer the contents of the first or second register region to the third register region.

According to a further feature of the invention, in order to provide simpler handling of subroutine call instructions and interrupts, the stack memory ST is provided with sixteen individual registers, each of them being six bits wide. In certain subroutine call instructions, the first and second register regions of the region control register BCR are transferred to the stack register ST, and a memory expansion indicator is incremented. The contents of the second register region are thereupon transferred to the first register region. Upon using certain instructions to leave the subroutine, the pointer is decremented, and the old contents of the first and second register regions are read out of the stack memory. This serves to assure the former state if any interrupts should occur. Further simplification in the handling of interrupts is attained by providing that upon the appearance of an interrupt, the contents of the fourth register region in the mode control register MCR are transferred to the first and second register regions of the region control register BCR, once their contents have been transferred to the stack register ST. As a result, interrupt service routines can be stored in a special memory region during programming. After a reset, the memory mode bit, the third register region and the fourth register region are all set equal to zero.

Finally, a stack register overflow bit, namely the bit 3 of the mode control register MCR, advantageously serves to indicate an incipient overflow of the stack register ST when the subroutine branching is extensive, in order to avoid loss of program control.

A decisive factor is that a release of the selected memory region does not take place immediately upon the writing-in of the applicable register region, namely the first register region, but rather only as a function of certain instructions and logic states derived in turn from them, or from certain other logic states of the processor unit PU. In the case of jump instructions and subroutine call instructions, the destination address is indicated, for example, and a new memory region is thereby simultaneously activated. The activation gives the interpretation unit IU priority, because that unit recognizes a corresponding logic state of the processor unit PU. Due to the stack register ST, subroutine call instructions are then possible in the entire physical address space, since the various region identification numbers are stored in memory in the stack memory ST. A stack memory present in the processor unit PU is in fact not capable of storing an expanded address. The stack memory ST is also advantageous for handling interrupts. In order to ensure that data and instructions need not be located in the same memory region, the data access can be diverted to another memory region, with suitable instructions. Software development can advantageously be performed largely with existing tools.

Besides the low circuitry expenditure, a circuit configuration according to the invention is distinguished by simplifications in program development, since a change in memory regions is independent of the writing-in of the associated register, since data and the program need not be stored in the same memory region, and since program interesting is readily possible.

I claim:

1. A circuit configuration for transforming a logical address space of a processor unit to a physical address space of a memory, said circuit configuration comprising an interpretation unit; data and control lines for connecting said interpretation unit to said processor unit, said interpretation unit including a register, said register having a first register region and a second register region, said second register region to be written into by said processor unit, said interpretation unit having means for continuously evaluating logic states of said processor unit, for writing contents of said second register region into said first register region at a first one of the logic states and for outputting contents of said first register region as a first address portion; a linking unit, and address lines for connecting said linking unit to said processor unit, to said interpretation unit and to said memory, said linking unit forming a physical address for said memory from the first address portion transferred by said interpretation unit and a second address portion transferred by said processor unit.

2. The circuit configuration according to claim 1, wherein said processor unit has means for reading said register of said interpretation unit.

3. The circuit configuration according to claim 1, including a stack register connected to said interpretation unit, contents of said first and second register regions being written into said stack register at a second one of the logic states of said processor unit, and said stack register being read out to said first and second register regions at a third one of the logic states.

4. The circuit configuration according to claim 3, wherein said register of said interpretation unit is a first register, said interpretation unit includes a second register with two further register regions, said two further register regions are written into by said processor unit in each case upon an appearance of a sixth one of the logic states, said second register has a given bit which is set by said processor unit, said interpretation unit has means for selectively reading out said first register region and one of said further register regions at a seventh one of said logic states of said processor unit, in dependence on the state of the given bit, and said second register has a further bit for indicating an overflow of said stack register.

5. The circuit configuration according to claim 1, wherein said register of said interpretation unit is a first register, and said interpretation unit includes a second register with two further register regions, said two further register regions being written into by said processor unit in each case upon an appearance of a fourth one of the logic states.

6. The circuit configuration according to claim 5, wherein said second register has a given bit which is set by said processor unit, and said interpretation unit has means for selectively reading out said first register region and one of said further register regions at a fifth one of the logic states of said processor unit, in dependence on the state of the given bit.

7. The circuit configuration according to claim 1, wherein said interpretation unit places said first and second register regions in a predetermined state, upon resetting of said processor unit.

* * * * *